A. Stone,
Tool for Making Glass Bottles.
No. 15,788.  Patented Sep. 23, 1856.
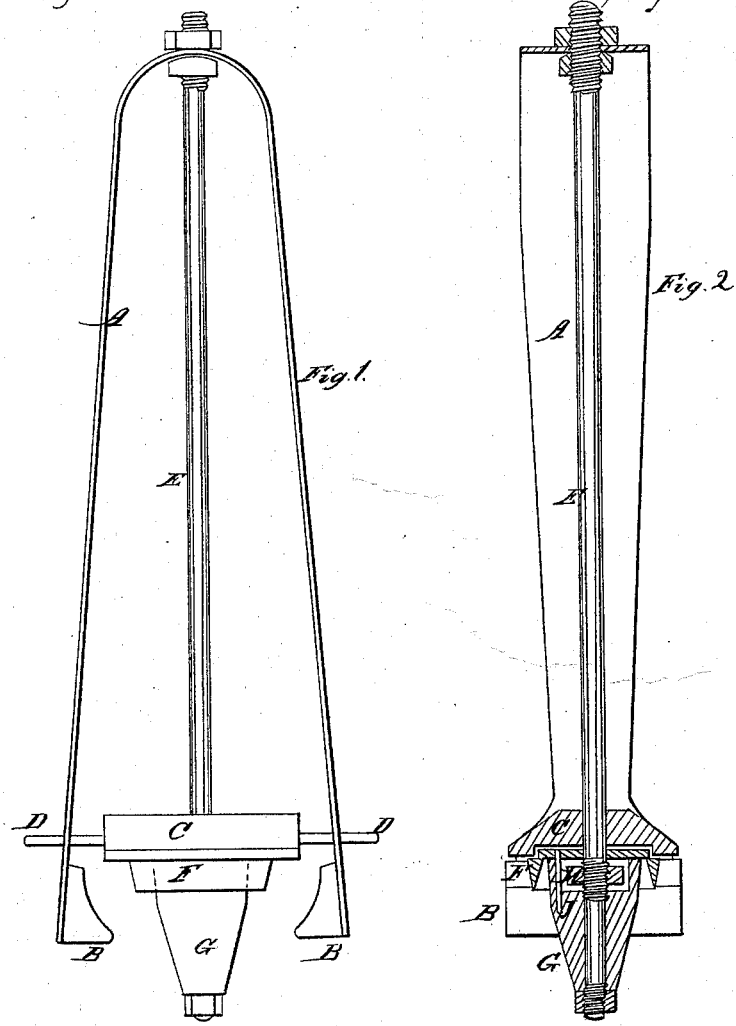
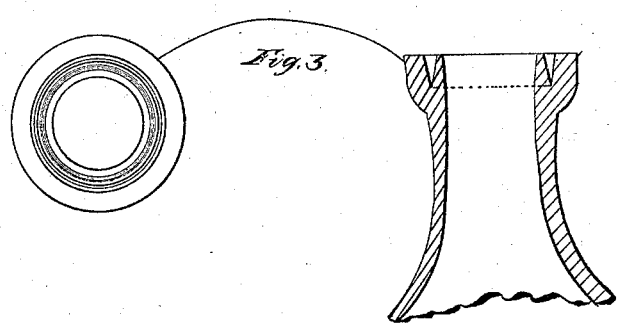

UNITED STATES PATENT OFFICE.

AMASA STONE, OF PHILADELPHIA, PENNSYLVANIA.

IMPROVED TOOL FOR FORMING GROOVES AROUND THE ORIFICE OF BOTTLES OR OTHER VESSELS MADE FROM PLASTIC SUBSTANCES.

Specification forming part of Letters Patent No. 15,788, dated September 23, 1856.

*To all whom it may concern:*

Be it known that I, AMASA STONE, of the city and county of Philadelphia, and State of Pennsylvania, have invented a new and useful Improvement in Tools for Making or Forming Grooves Around the Orifices of Bottles or other Vessels Made from Plastic Substances; and I do hereby declare that the same is described and represented in the following specification and drawings.

To enable others skilled in the art to make and use my improvements, I will proceed to describe their construction and use, referring to the drawings, in which the same letters indicate like parts in each of the figures.

Figure 1 is a plan of a tool with my improvement. Fig. 2 is a section of Fig. 1, cut through the center. Fig. 3 is a plan and section of a bottle-nose formed with the tool.

The nature of my invention and improvement in tools for forming the orifices of bottles and other vessels made from plastic substances consists in making a flange to project from the face-plate and arranging it to revolve freely either with or without the plug that forms the interior of the orifice, this revolving flange being so constructed and arranged as to form a groove in the end of the bottle-nose or around the orifice of the opening in the vessel formed by the tool.

In the above-mentioned drawings, A is a metal spring provided with a pair of steel jaws B B, so as to make a pair of forming forceps or tool, the interior of the jaws being made in such a shape as to give the outside of the nozzle of the bottle or neck of the vessel formed the desired shape as it is rotated between said jaws in a plastic state, the jaws being pressed together upon the nozzle of the bottle or end of the vessel being formed by the hand of the workman.

C is a face-plate arranged just in rear of the jaws B B and provided with a pivot D at each end, which works freely in the spring A near the jaws, as shown in the drawings.

E is a spindle with one end fastened in the bow of the spring A, as shown in the drawings, and passing through the plate C, flanged disk F, and plug G, and is provided with a screw-nut beyond the plug to hold it (the plug) in its place. The face-plate C has a recess in its front side, to which the disk F is fitted so as to turn freely, as it does, on the spindle, and the screw-nut H holds the disk against the plate and may be left loose, so as to let the disk turn freely, or screwed, so as to press the disk against the plate and prevent it from turning. The plug G is fitted to turn freely on the spindle E and is provided with a recess in its rear end for the nut H, as shown in the drawings, so that the rear of the plug comes to the disk F a little distance within the flange, so that the plug forms the inside of the bottle-nose, the jaws B B the outside, while the flange on the disk F forms a groove or score in the end around the orifice of the bottle, as shown in Fig. 3.

The above-described tool is found to work well in practice in making glass bottles and jaws if the flange which forms the groove around the orifice of the bottle or jaw is allowed to turn freely when the tool is used, whether the plug is allowed to turn also or not, so that the workman may use his own judgment in regard to whether he will allow the plug to turn or not, as the nut H may be set so far from the disk as to hold the plug fast and prevent it from turning. If he wishes the plug and disk to turn together, he may set the nut H, so that it will bind neither of them, and insert the dowel-pin J, which will connect the two, so that they will turn together. It is found that if the flange is held stationary it is very difficult and almost impossible to manipulate the glass so as to work it in between the flange and the plug, so as to form the orifice perfect; but if the flange is allowed to turn freely, as above described, they are formed perfect with the greatest facility and with very little, if any, more trouble than it is to form the nose of the bottle or jar without a groove. I contemplate that the jaws, flange, and plug may be made in such form as will adapt them to the service for which they are intended and that the tool with my improvements may be used in working clay, stone, or other plastic substances.

The object and design of the groove around the orifices of bottles, jars, and other vessels is to receive the flange of the cover or stopper and then to seal it by filling the groove with a cement.

I believe I have described the construction, operation, and use of my improvement so as to enable any person skilled in the same to make and use it. I will now specify what I desire to secure by Letters Patent, to wit:

What I claim in the above-described tool for forming the orifices of bottles or other vessels made from plastic substances with a groove around the orifice is—

The revolving flange F, constructed and arranged to form a groove in the end of the bottle-nose or other vessel, substantially as described.

<div style="text-align:right">AMASA STONE.</div>

Witnesses:
   J. DENNIS, Jr.,
   JOHN S. HOLLINGSHEAD.